3,362,918
METHOD OF POLYMERIZING AND COPOLYM-
ERIZING PROPYLENE OXIDE
Clifford W. Childers, Bartlesville, Okla., assignor to Uniroyal, Inc., a corporation of New Jersey
No Drawing. Filed June 9, 1964, Ser. No. 373,870
12 Claims. (Cl. 260—2)

ABSTRACT OF THE DISCLOSURE

A method of polymerizing propylene oxide and copolymerizing propylene oxide and butadiene is disclosed which may be carried out in a hydrocarbon solution of a mixture of dialkyl zinc in which the alkyl radicals have 2 to 6 carbon atoms, and one or more of the following: (1) bis(trialkyl phosphine) nickel dihalides in which the alkyl radicals have 2 to 6 carbon atoms; (2) bis(triphenyl phosphine) nickel dihalides; (3) ethylene bis(diphenyl phosphine) nickel dihalides and (4) bis(trialkylphosphine) cadmium dihalides in which the alkyl radicals have 2 to 6 carbon atoms, and in which the dihalides are those of chlorine, bromine or iodine. These copolymers have utility as elastomers, adhesives, coatings, etc.

---

This invention relates to polymerizations and more particularly to the homopolymerization of propylene oxide and the copolymerization of propylene oxide with butadiene.

The present invention provides a new catalyst for polymerization of propylene oxide to a high molecular weight rubbery polymer and for copolymerization of propylene oxide with butadiene to a high molecular weight rubbery copolymer. The term high molecular weight as used herein refers to a polymer or to a copolymer with a dilute solution viscosity of at least 0.1 in benzene, which corresponds approximately to a number average molecular weight of at least 10,000.

The catalyst of the present invention comprises a mixture of dialkylzinc in which the alkyl radicals have 2 to 6 carbon atoms with a metal complex selected from the following: bis(trialkylphosphine)nickel dihalide in which the alkyl radicals have 2 to 6 carbon atoms, bis(triphenylphosphine)nickel dihalide, ethylene bis(diphenylphosphine)nickel dihalide, and bis(trialkylphosphine)cadmium dihalide in which the alkyl groups have 2 to 6 carbon atoms. The dihalides may be dichlorides, dibromides or diiodides. Examples of the dialkylzinc compounds are diethylzinc, di-n-butylzinc, diisobutylzinc, dihexylzinc. Examples of the trialkylphosphine component of the bis(trialkylphosphine)metal dihalides are triethylphosphine, tri-n-butylphosphine, triisobutylphosphine and trihexylphosphine. The mole ratio of zinc to nickel or cadmium may be in the range of 1:1 to 20:1. The polymerization is carried out by adding propylene oxide, or propylene oxide and 1,3-butadiene (herein called "butadiene"), to a solution of the catalyst in a hydrocarbon solvent which is a saturated aliphatic or aromatic solvent, e.g. pentane, heptane, hexane, octane, cyclohexane, benzene, toluene, xylene, etc. The polymerization temperature is not critical and may range from 0° C. to 100° C. In the copolymerization of propylene oxide and butadiene, the weight ratio of propylene oxide to butadiene monomers used may be in the range of 1:10 to 10:1. The copolymers will contain 10% to 90% of polymerized propylene oxide component and correspondingly 90% to 10% of the polymerized butadiene component (total). These copolymers are new copolymer compositions with utility as elastomers, adhesives, coatings, etc.

The following examples illustrate the invention. All parts and percentages referred to herein are by weight unless otherwise indicated.

Example 1

Two milliliters (ml.) of a 25% solution of di-n-butylzinc in heptane [2.0 millimoles of (n-butyl)$_2$Zn], 0.26 g. (0.5 millimole) of ethylenebis(diphenyl)phosphine nickel dichloride ($\phi_2$PC$_2$H–P$\phi_2$)NiCl$_2$, and 3.5 ml. (50 millimoles) of propylene oxide (which had been refluxed over KOH pellets, distilled, and dried over calcium hydride) were mixed in 3 ml. of hexane (which had been dried over molecular sieve) in a dry glass tube of approximately 50 ml. capacity under nitrogen. The

in this and other examples was prepared by adding a slurry of tetraphenylethylenediphosphine in absolute ethanol to the nickel chloride (stoichiometric amounts) dissolved in absolute ethanol. The complex which formed immediately was filtered, washed with absolute ethanol and dried in vacuum. The tube was capped and 2.7 g. (50 millimoles) of butadiene were added through the bottle cap (which had a self-sealing rubber gasket) by means of a hypodermic needle. After seven days at room temperature, about 0.1 g. of high molecular weight copolymer was recovered by pouring the viscous polymerization mixture into approximately 400 ml. of methanol and precipitating with water. After reprecipitation from benzene the structure of the copolymer, as revealed by infrared analysis, was 53% polypropylene oxide, 35% trans-polybutadiene (trans-1,4-polybutadiene) and 12% "vinyl polybutadiene" (i.e., 1,2-polybutadiene).

Example 2

2.6 milliliters of a 25% solution of (n-butyl)$_2$Zn in heptane [2.6 millimoles of (n-butyl)$_2$Zn], 0.26 g. (0.5 millimole) of ($\phi_2$PC$_2$H$_4$P$\phi_2$)NiCl$_2$, and 35 ml. (0.5 mole) of dry propylene oxide were mixed in 30 ml. of dry hexane in a bottle of about 700 ml. capacity, under nitrogen. The bottle was capped and 28 g. (0.5 mole) of butadiene was added through the cap. After five days at 50° C., about 4 g. of high molecular weight copolymer was obtained. Composition of the copolymer, as measured by infrared analysis, was 17% polypropylene oxide, 63% trans-polybutadiene and 20% "vinyl polybutadiene."

Example 3

2.6 milliliters of a 25% solution of (n-butyl)$_2$Zn in heptane [2.6 millimoles of (n-butyl)$_2$Zn], 1 g. (2 millimoles) of $\phi_2$PC$_2$H$_4$P$\phi_2$)NiCl$_2$, and 35 ml. (0.5 mole) of dry propylene oxide were mixed in 30 ml. of dry hexane in a bottle of about 700 ml. capacity, under nitrogen. The bottle was capped and 28 g. (0.52 mole) of butadiene was added through the cap. After five days at 50° C., about 11 g. of high molecular weight copolymer was obtained. Composition of the copolymer, as measured by infrared analysis, was 51% polypropylene oxide, 38% trans-polybutadiene and 11% "vinyl polybutadiene."

Example 4

This example was the same as Example 1 except that the nickel complex used was 0.33 g. (0.5 millimole) of bis(triphenylphosphine)nickel dichloride

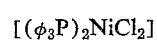

prepared by the method of Venanzi, Jour. Chem. Soc. (London) 1958, p. 719. The structure of the high molecular weight polymer obtained, as revealed by infrared analysis, was 57% polypropylene oxide, 29% trans-polybutadiene and 4% "vinyl polybutadiene."

Example 5

This example was the same as Example 1 except that the nickel complex used was 0.27 g. (0.5 millimole) of bis(tri-n-butylphosphine)nickel dichloride

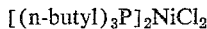

prepared by adding tributyl phosphine to nickel chloride (stoichiometric amounts) dissolved in absolute ethanol. The mixture was allowed to stand overnight. Red crystals were filtered off, washed with ethanol and dried in vacuum. High molecular weight copolymer, about 0.2 g., was obtained. The structure by infrared analysis was 78% polypropylene oxide, 8% trans-polybutadiene and 15% "vinyl polybutadiene."

Example 6

This example was the same as Example 1 except that the nickel complex used was 0.36 g. (0.5 millimole) of bis(tri-n-butylphosphine)nickel diiodide

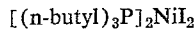

prepared by adding tributyl phosphine to nickel iodide (stoichiometric amounts) dissolved in absolute ethanol. The ethanol was distilled off under reduced pressure and the green liquid product was dried further in vacuum. High molecular weight copolymer, about 0.1 g., was obtained. The structure by infrared analysis was 69% polypropylene oxide, 26% trans-polybutadiene and 5% "vinyl polybutadiene."

Example 7

This example was similar to Example 1 except that, for the metal complex, 0.26 ml. (.21 g.), equal to 1.0 millimole, of tri-n-butylphosphine, $(n\text{-butyl})_3P$, and 0.09 g. (0.49 millimole) of cadmium chloride were added to form 0.49 millimole of bis(tri-n-butylphosphine)cadmium dichloride—$[(n\text{-butyl})_3P]_2CdCl_2$—in situ. Disappearance of the insoluble cadmium chloride was evidence of reaction having taken place. After eight days, about 0.1 g. of high molecular weight copolymer was recovered. The structure by infrared analysis was 79% polypropylene oxide, 13% trans-polybutadiene and 8% "vinyl polybutadiene."

Example 8

This example was similar to Example 1 except that 0.27 g. (0.5 millimole) of $[(n\text{-butyl})_3P]_2NiCl_2$ was used as the metal complex, and no butadiene was added. High molecular weight polypropylene oxide, about 0.2 g., was obtained (identified by infrared analysis).

Example 9

This example was similar to Example 1 except that, for the metal complex, 0.26 ml. (1 millimole) of $(n\text{-butyl})_3P$ and 0.09 g. (0.49 millimole) of $CdCl_2$ were added, and no butadiene was added. High molecular weight polypropylene oxide, about 0.2 g., was obtained (identified by infrared analysis).

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of copolymerizing propylene oxide and butadiene which comprises contacting propylene oxide and butadiene in solution in a hydrocarbon solvent with a mixture of a dialkylzinc in which the alkyl radicals have 2 to 6 carbon atoms, and material selected from the group consisting of bis(trialkylphosphine)nickel dihalides in which the alkyl radicals have 2 to 6 carbon atoms, bis(triphenylphosphine)nickel dihalides, ethylenebis(diphenylphosphine)nickel dihalides, and bis(trialkylphosphine)cadmium dihalides in which the alkyl radicals have 2 to 6 carbon atoms, said dihalides being selected from the group consisting of dichloride, dibromide and diiodide.

2. The method of copolymerizing propylene oxide and butadiene which comprises contacting propylene oxide and butadiene in solution in a hydrocarbon solvent with a mixture of $(n\text{-butyl})_2Zn$ and $[(n\text{-butyl})_3P]_2NiCl_2$.

3. The method of copolymerizing propylene oxide and butadiene which comprises contacting propylene oxide and butadiene in solution in a hydrocarbon solvent with a mixture of $(n\text{-butyl})_2Zn$ and $[(n\text{-butyl})_3P]_2NiI_2$.

4. The method of copolymerizing propylene oxide and butadiene which comprises contacting propylene oxide and butadiene in solution in a hydrocarbon solvent with a mixture of $(n\text{-butyl})_2Zn$ and $[(n\text{-butyl})_3P]_2CdCl_2$.

5. The method of copolymerizing propylene oxide and butadiene which comprises contacting propylene oxide and butadiene in solution in a hydrocarbon solvent with a mixture of $(n\text{-butyl})_2Zn$ and $(\phi_3P)_2NiCl_2$.

6. The method of copolymerizing propylene oxide and butadiene which comprises contacting propylene oxide and butadiene in solution in a hydrocarbon solvent with a mixture of $(n\text{-butyl})_2Zn$ and $(\phi_2PC_2H_4P\phi_2)NiCl_2$.

7. The method of polymerizing propylene oxide which comprises contacting propylene oxide in solution in a hydrocarbon solvent with a mixture of a dialkylzinc in which the alkyl radicals have 2 to 6 carbon atoms, and material selected from the group consisting of bis(trialkylphosphine)nickel dihalides in which the alkyl radicals have 2 to 6 carbon atoms, bis(triphenylphosphine)nickel dihalides, ethylenebis(diphenylphosphine)nickel dihalides, and bis(trialkylphosphine)cadmium dihalides in which the alkyl radicals have 2 to 6 carbon atoms, said dihalides being selected from the group consisting of dichloride, dibromide and diiodide.

8. The method of polymerizing propylene oxide which comprises contacting propylene oxide in solution in a hydrocarbon solvent with a mixture of $(n\text{-butyl})_2Zn$ and $[(n\text{-butyl})_3P]_2NiCl_2$.

9. The method of polymerizing propylene oxide which comprises contacting propylene oxide in solution in a hydrocarbon solvent with a mixture of $(n\text{-butyl})_2Zn$ and $[(n\text{-butyl})_3P]_2NiI_2$.

10. The method of polymerizing propylene oxide which comprises contacting propylene oxide in solution in a hydrocarbon solvent with a mixture of $(n\text{-butyl})_2Zn$ and $[(n\text{-butyl})_3P]_2CdCl_2$.

11. The method of polymerizing propylene oxide which comprises contacting propylene oxide in solution in a hydrocarbon solvent with a mixture of $(n\text{-butyl})_2Zn$ and $(\phi_3P)_2NiCl_2$.

12. The method of polymerizing propylene oxide which comprises contacting propylene oxide in solution in a hydrocarbon solvent with a mixture of $(n\text{-butyl})_2Zn$ and $(\phi_2PC_2H_4P\phi_2)NiCl_2$.

References Cited

UNITED STATES PATENTS

| | | | |
|---|---|---|---|
| 2,870,100 | 1/1959 | Stewart et al. | 260—2 |
| 3,077,467 | 2/1963 | Gurgiolo | 26—83.5 |
| 3,267,087 | 8/1966 | Childers | 252—431 |

OTHER REFERENCES

Chemical Society of Japan Bulletin vol. 33, Ishida, July 1960 (pp. 924–930 relied on).

WILLIAM H. SHORT, *Primary Examiner.*

T. E. PERTILLA, *Assistant Examiner.*

PO-1050
(5/69)

UNITED STATES PATENT OFFICE
CERTIFICATE OF CORRECTION

Patent No. 3,362,918      Dated January 9, 1968

Inventor(s) Clifford W. Childers

It is certified that error appears in the above-identified patent and that said Letters Patent are hereby corrected as shown below:

In Claim 3, the final compound should be $$[(n\text{-butyl})_3P]_2NiI_2.$$

Signed and sealed this 9th day of November 1971.

(SEAL)
Attest:

EDWARD M. FLETCHER, JR.      ROBERT GOTTSCHALK
Attesting Officer      Acting Commissioner of Patents